United States Patent
Tsai et al.

(10) Patent No.: US 11,472,961 B2
(45) Date of Patent: Oct. 18, 2022

(54) POLYMER, METAL REMOVAL COMPOSITION, AND METHOD OF REMOVING METAL IONS

(71) Applicant: INDUSTRIAL TECHNOLOGY RESEARCH INSTITUTE, Hsinchu (TW)

(72) Inventors: Min-Fei Tsai, Taoyuan (TW); Feng-Jen Tsai, Taipei (TW); Ping-Yen Chen, Taichung (TW); Yen-Cheng Li, Hsinchu (TW); Li-Han Chung, Miaoli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 424 days.

(21) Appl. No.: 16/840,591

(22) Filed: Apr. 6, 2020

(65) Prior Publication Data
US 2021/0238415 A1    Aug. 5, 2021

(30) Foreign Application Priority Data
Feb. 4, 2020    (TW) ................. 109103325

(51) Int. Cl.
| | |
|---|---|
| *C08L 81/06* | (2006.01) |
| *C02F 1/68* | (2006.01) |
| *C08L 29/04* | (2006.01) |
| *C08L 39/06* | (2006.01) |
| *C08J 5/18* | (2006.01) |
| *C08L 71/02* | (2006.01) |
| *C02F 101/20* | (2006.01) |

(52) U.S. Cl.
CPC ............. *C08L 81/06* (2013.01); *C02F 1/68* (2013.01); *C02F 2101/20* (2013.01); *C08J 5/18* (2013.01); *C08L 29/04* (2013.01); *C08L 39/06* (2013.01); *C08L 71/02* (2013.01); *C08L 2203/12* (2013.01); *C08L 2203/16* (2013.01)

(58) Field of Classification Search
CPC .......... C08L 81/06; C08L 29/04; C08L 39/06; C08L 2203/12; C08L 2203/16; C08L 71/02; C02F 1/68; C02F 2101/20; C08J 5/18
USPC ........................................................ 210/681
See application file for complete search history.

(56) References Cited

U.S. PATENT DOCUMENTS

| | | | |
|---|---|---|---|
| 4,612,122 A | 9/1986 | Ambrus et al. | |
| 4,616,041 A | 10/1986 | Sterzel et al. | |
| 5,208,192 A | 5/1993 | Yu et al. | |
| 6,296,760 B1 * | 10/2001 | Petty | B01J 45/00 |
| | | | 73/61.41 |
| 8,043,762 B2 | 10/2011 | Higami et al. | |
| 8,399,148 B2 | 3/2013 | Higami et al. | |
| 8,505,746 B2 * | 8/2013 | Tsuzawa | B01D 71/68 |
| | | | 427/244 |
| 9,199,219 B2 * | 12/2015 | Inoue | B01J 20/3217 |
| 10,450,632 B2 * | 10/2019 | Peinemann | B01D 67/0023 |
| 2010/0292481 A1 * | 11/2010 | Oda | C07D 333/10 |
| | | | 568/309 |

FOREIGN PATENT DOCUMENTS

| | | |
|---|---|---|
| EP | 0227893 A3 | 7/1987 |
| EP | 1332234 B1 | 12/2004 |
| TW | I522448 B | 2/2016 |

OTHER PUBLICATIONS

Taiwanese Office Action and Search Report for Taiwanese Application No. 109103325, dated Aug. 3, 2020.

* cited by examiner

*Primary Examiner* — Michael M. Bernshteyn
(74) *Attorney, Agent, or Firm* — Birch, Stewart, Kolasch & Birch, LLP

(57) ABSTRACT

A method of removing metal ions is provided, which includes contacting a metal removal composition with a solution containing metal ions for removing the metal ions from the solution, wherein the metal removal composition includes a polymer with a chemical structure of:

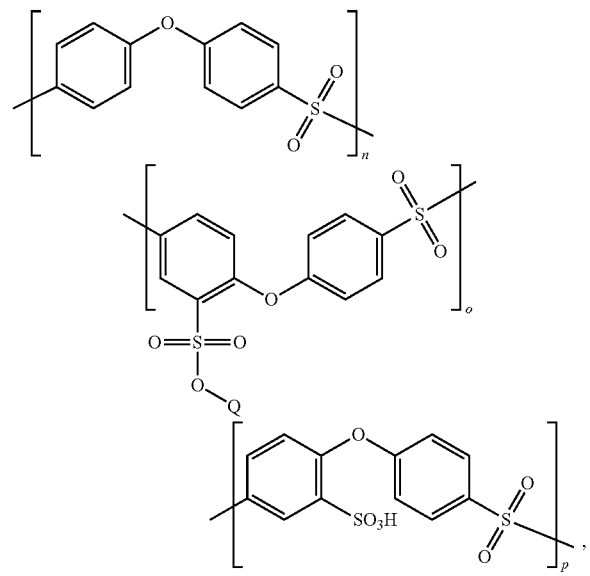

wherein Q is a quinoline-based group, n=90~450, o=10~50, and p=0~20. The metal removal composition has a type of fiber or film. In addition, the metal removal composition has a porosity of 60% to 90%.

12 Claims, No Drawings

POLYMER, METAL REMOVAL COMPOSITION, AND METHOD OF REMOVING METAL IONS

CROSS REFERENCE TO RELATED APPLICATIONS

The present application is based on, and claims priority from, Taiwan Application Serial Number 109103325, filed on Feb. 4, 2020, the disclosure of which is hereby incorporated by reference herein in its entirety.

TECHNICAL FIELD

The technical field relates to polymer, and in particular it relates to a method of removing metal ions using a composition containing the polymer.

BACKGROUND

If water sources are polluted by toxic metal ions due to environmental pollution or pipeline pollution, these metal ions will accumulate in vital organs after ingestion, producing irreversible symptoms. In the past, the methods that were generally used for removing metal ions from water were reverse osmosis, ion exchange resins, or coatings of chelating substances.

Reverse osmosis (RO) may treat the water source, but beneficial metal ions in the water will be also removed, and an electrolyte imbalance may occur after long-term ingestion. Ionic exchange resin may replace the metal ions in the water with sodium ions, which is not always beneficial for users with poor kidney function. The coatings of chelating substances are only suitable for treating industrial water because the chelating substances are toxic, or possibly precipitated. In addition, the coating may affect the water flux and cannot be formed as a film alone.

Accordingly, a novel polymer is needed to form a fiber or a film for removing metal ions.

SUMMARY

One embodiment of the disclosure provides a polymer, having a chemical structure of:

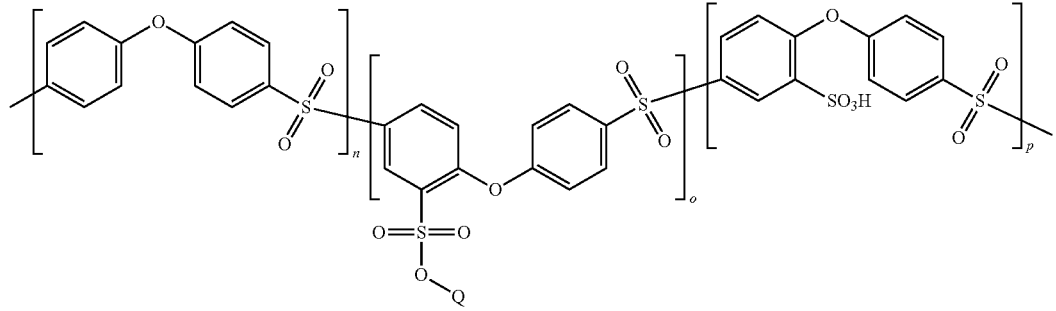

wherein Q is a quinoline-based group, n=90~450, o=10~50, and p=0~20.

In some embodiments, Q is

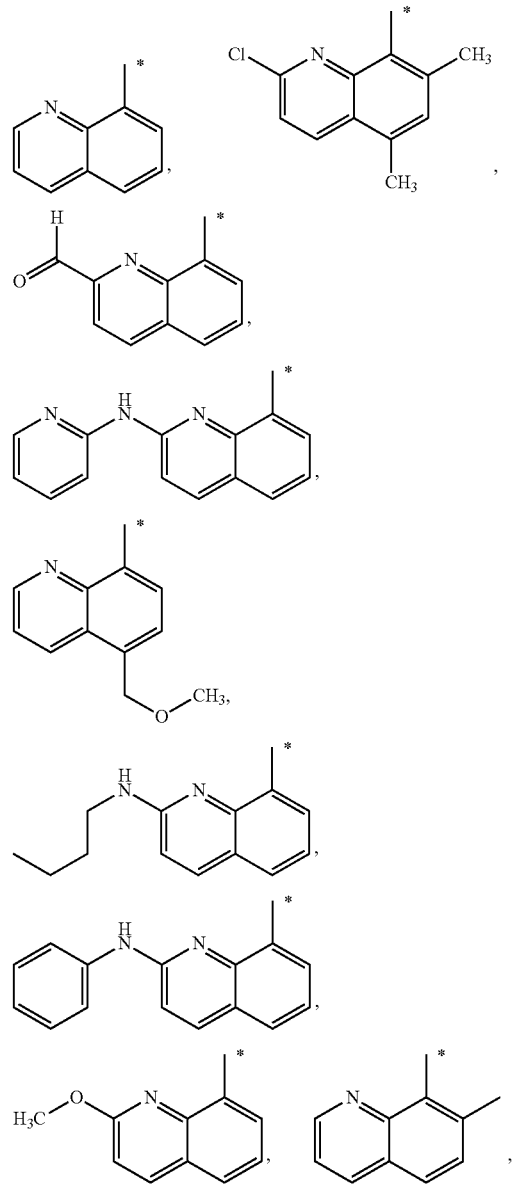

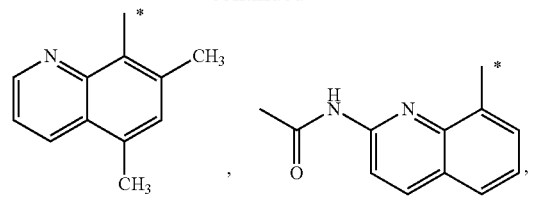
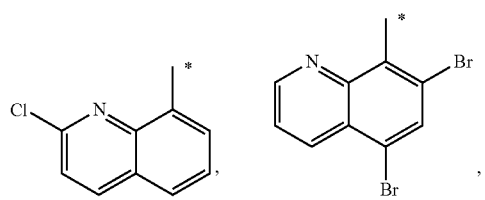
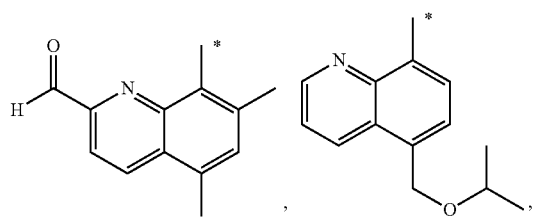
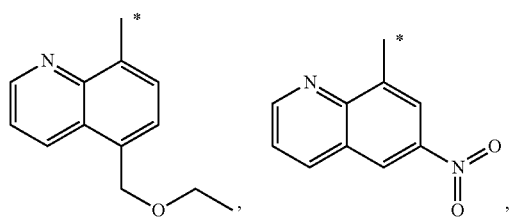
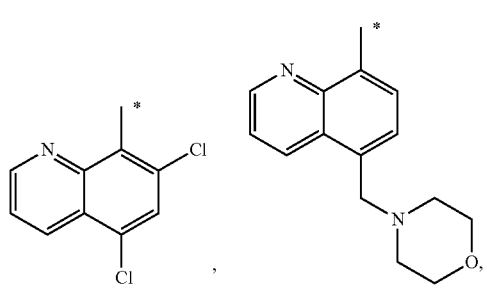
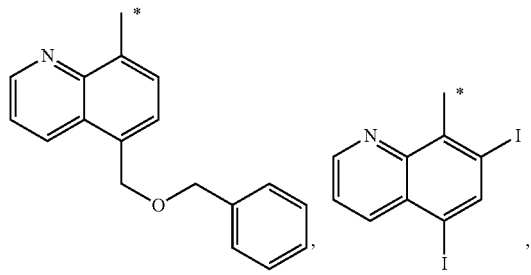
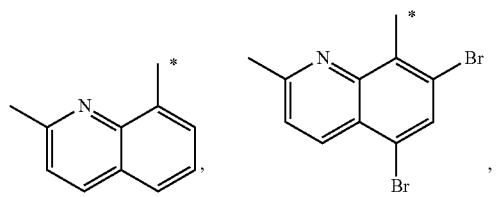
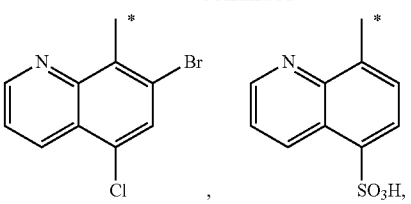
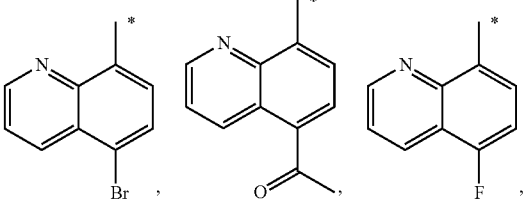
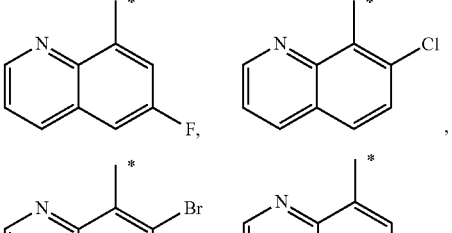
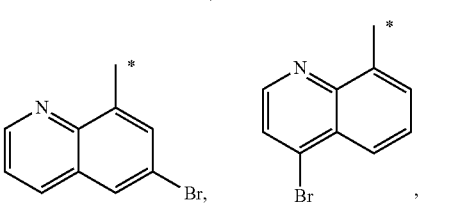
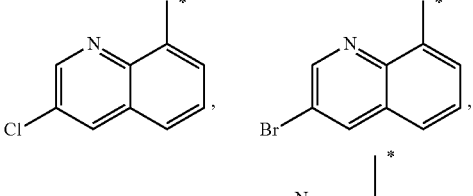
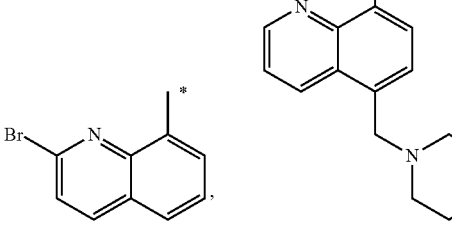
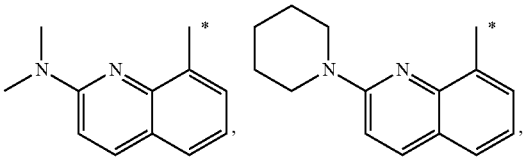
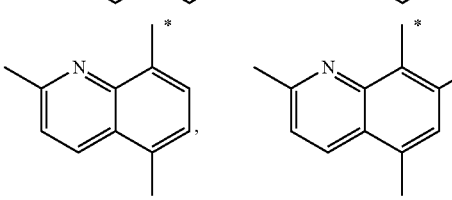

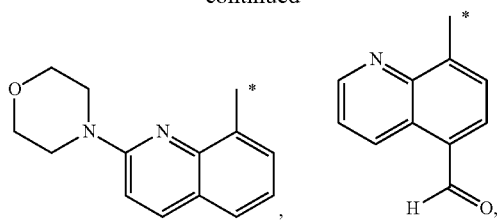
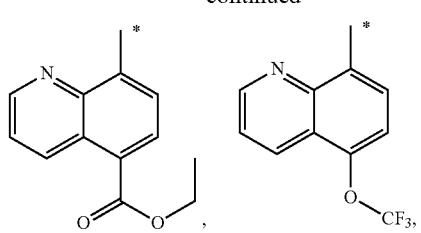
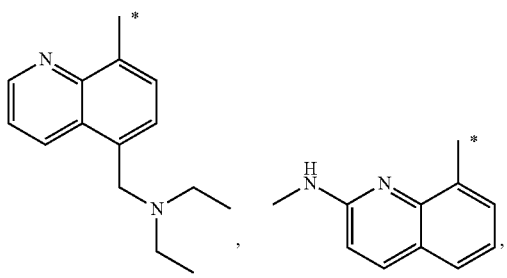
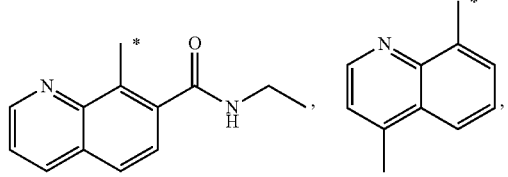
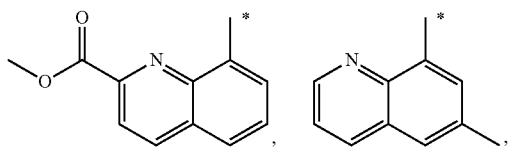
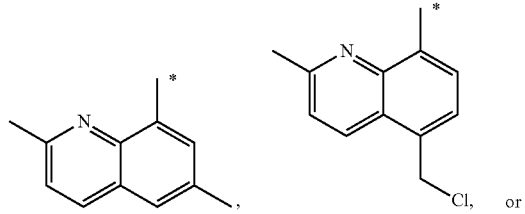
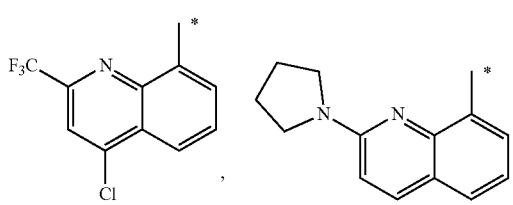
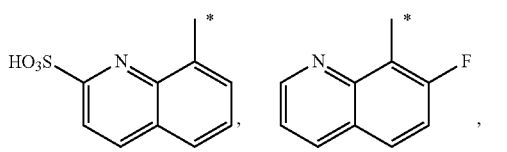
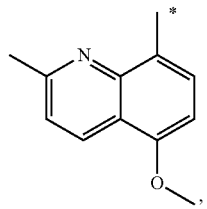
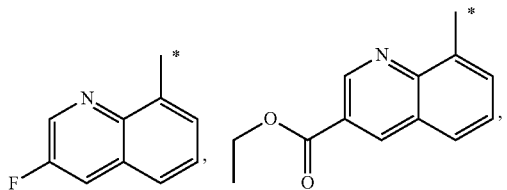
wherein * is connected to O of the side sulfonate group of the polymer.
One embodiment of the disclosure provides a metal removal composition, including a polymer having a chemical structure of:
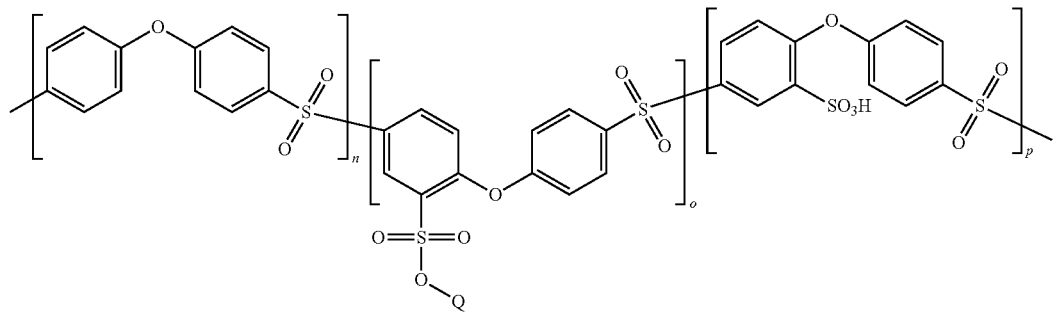

wherein Q is a quinoline-based group, n=90~450, o=10~50, and p=0~20.

In some embodiments, the metal removal composition further includes polyether sulfone, sulfonated polyether sulfone, or a combination thereof, and (1) polymer and (2) polyether sulfone, sulfonated polyether sulfone, or a combination thereof have a weight ratio of 100:0 to 100:300.

In some embodiments, the metal removal composition has a type of fiber that has a diameter of 100 micrometers to 600 micrometers.

In some embodiments, the metal removal composition has a type of film that has a thickness of 20 micrometers to 60 micrometers.

In some embodiments, the metal removal composition further includes water soluble polymer to serve as a porogen, and the water soluble polymer includes polyvinyl pyrrolidone, polyvinyl alcohol, or polyethylene glycol.

In some embodiments, the metal removal composition has a porosity of 60% to 90%.

One embodiment of the disclosure provides a method of removing metal ions, including: contacting a metal removal composition with a solution containing metal ions for removing the metal ions from the solution, wherein the metal removal composition includes a polymer with a chemical structure of:

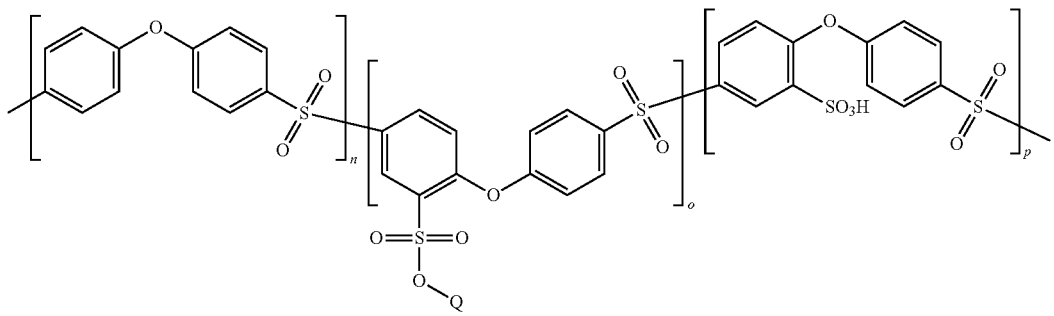

wherein Q is a quinoline-based group, n=90~450, o=10~50, and p=0~20.

In some embodiments, the metal removal composition further includes polyether sulfone, sulfonated polyether sulfone, or a combination thereof, and (1) polymer and (2) polyether sulfone, sulfonated polyether sulfone, or a combination thereof have a weight ratio of 100:0 to 100:300.

In some embodiments, the metal removal composition has a type of fiber or film.

In some embodiments, the metal ions include iron ions, lead ions, mercury ions, cobalt ions, or cadmium ions.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a polymer, having a chemical structure of:

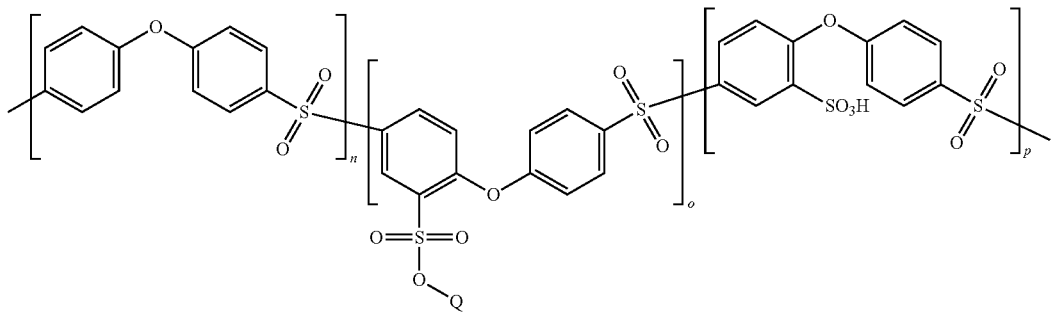

wherein Q is a quinoline-based group, n=90~450, o=10~50, and p=0~20. If n is too small, the molecular weight of the polymer will be insufficient and the low-molecular polymer may result in poor film/fiber formability. If n is too large, the solubility of the polymer will be too low and the viscosity of the polymer solution will be too high, and the polymer solution will be difficult to be coated as a film or drawn as a fiber. If o is too small, the metal removal ratio will be low. If p is too large, the strength of the film or fiber composed of the polymer will be low.

In one embodiment, the polymer is synthesized as below. It should be understood that the polymer can be synthesized by one skilled in the art through another way and not limited to the following way. First, polyether sulfone can be dissolved in dichloromethane and disposed in a reaction bottle, and then cooled to 0° C. to 5° C. in ice bath. Cholorosulfonic acid is then added into dichloromethane, and then slowly and dropwise added into the reaction bottle. The mixture is stirred and reacted under nitrogen, and the stirring is stopped. The reaction result is let stand to separate into two layers, and the upper layer is removed. The reaction is shown below.

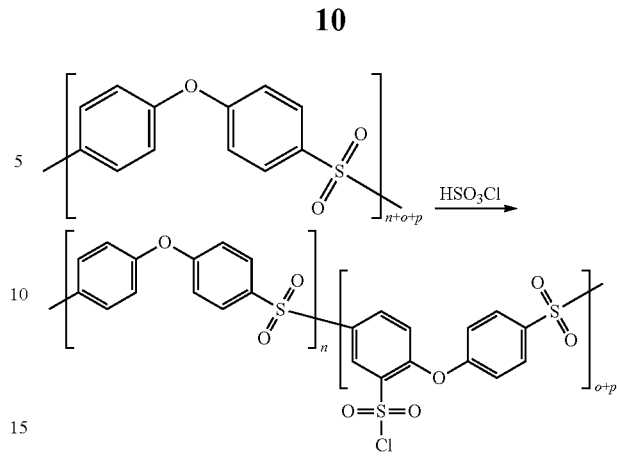

Subsequently, the hydroxyl-containing quinoline-based compound (e.g. Q-OH) is dissolved in dichloromethane, and dropwise added into the reaction bottle to be reacted at 30° C. in water bath. The reaction result is poured into ice water to precipitate, and the precipitate is continuously washed with water until achieving a pH value of 6 to 7. The washed precipitate is dried to obtain a polymer. The reaction is shown below.

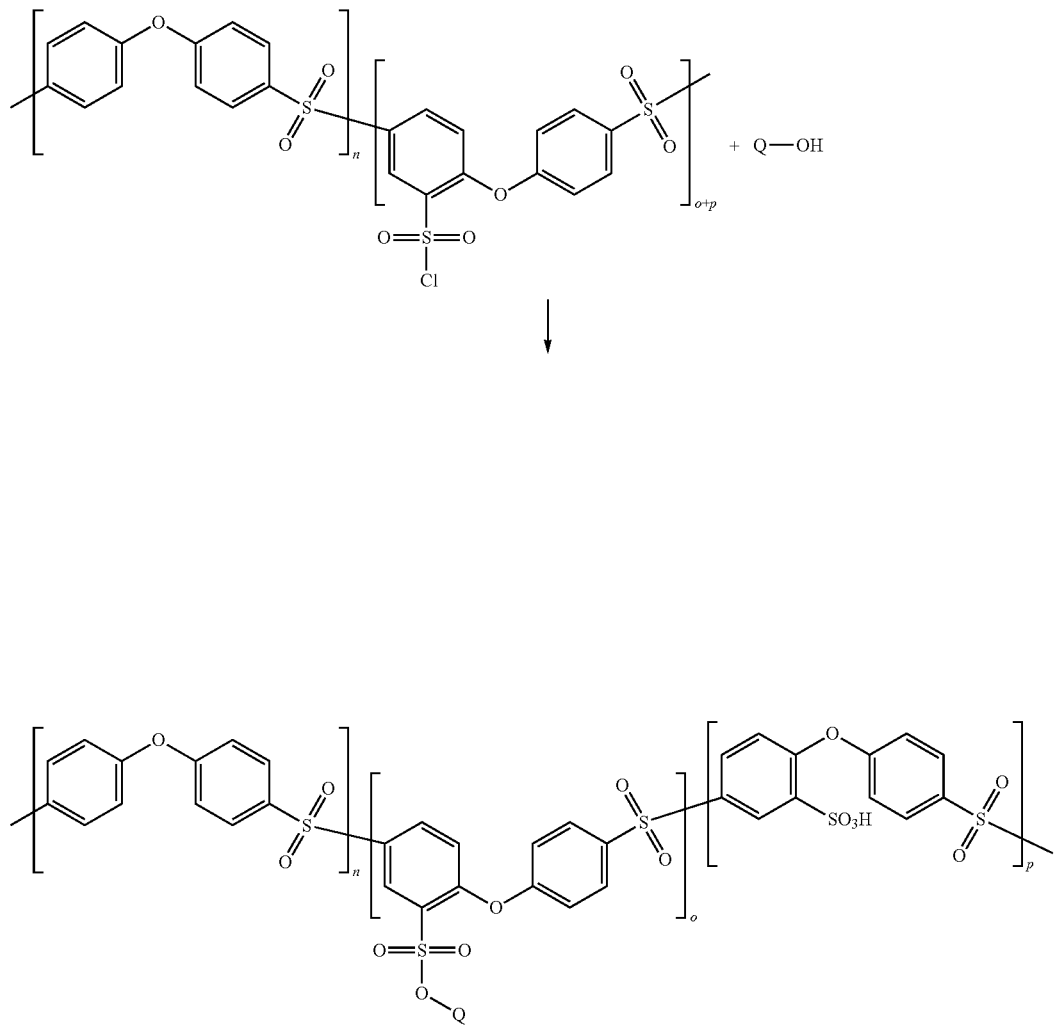

In ideal case, all the sulfonyl chloride groups on the polyether sulfone are reacted with Q-OH (e.g. p=0). In practice, some sulfonyl chloride groups may be hydrolyzed to form sulfonic acid (e.g. p≠0).
In some embodiments, Q is
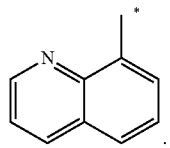
As such, Q-OH is
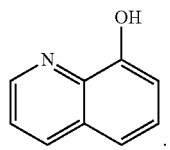
In other embodiments, Q can be,
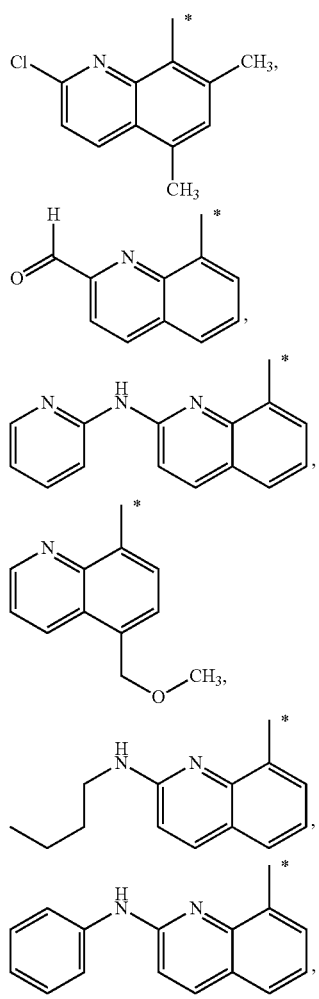
-continued
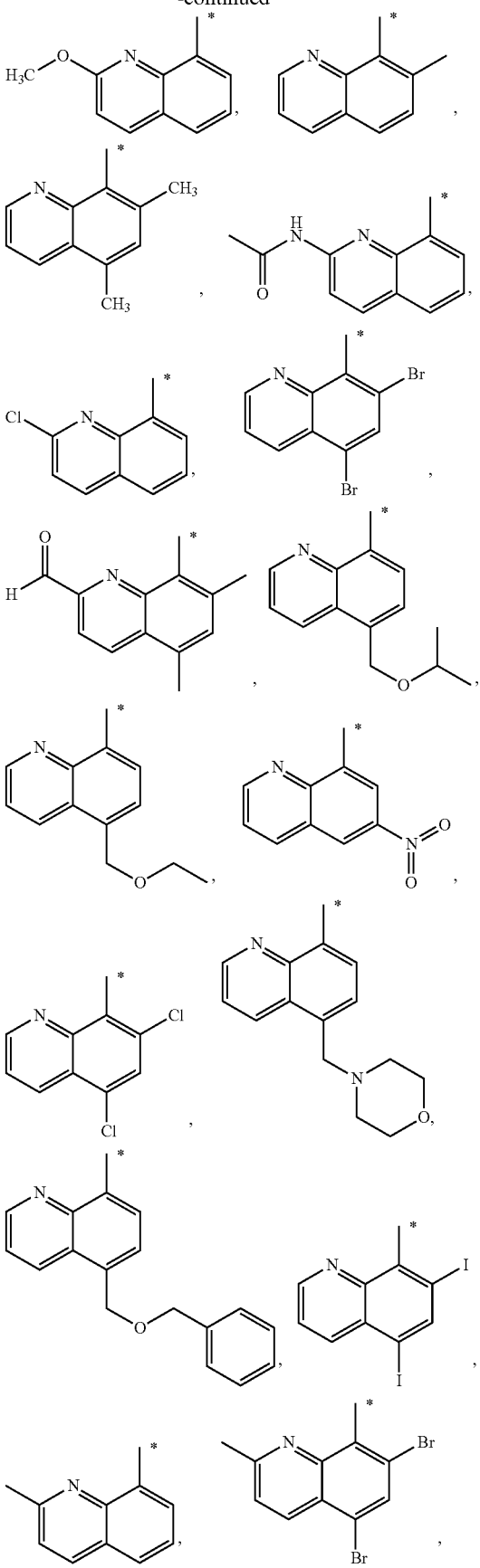

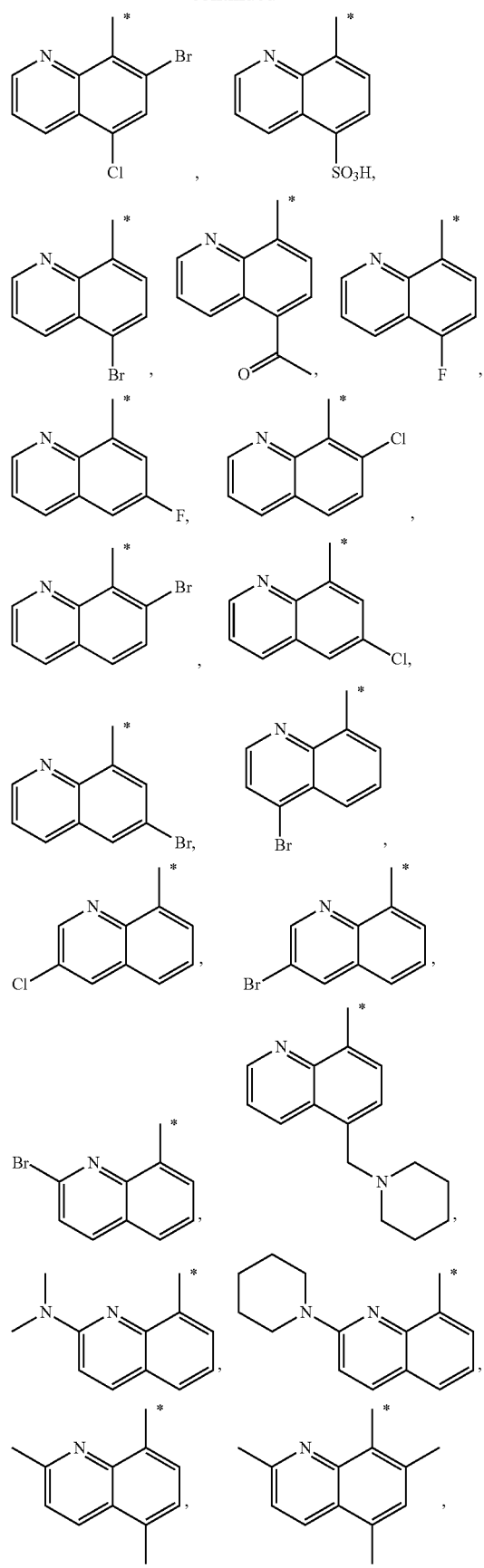
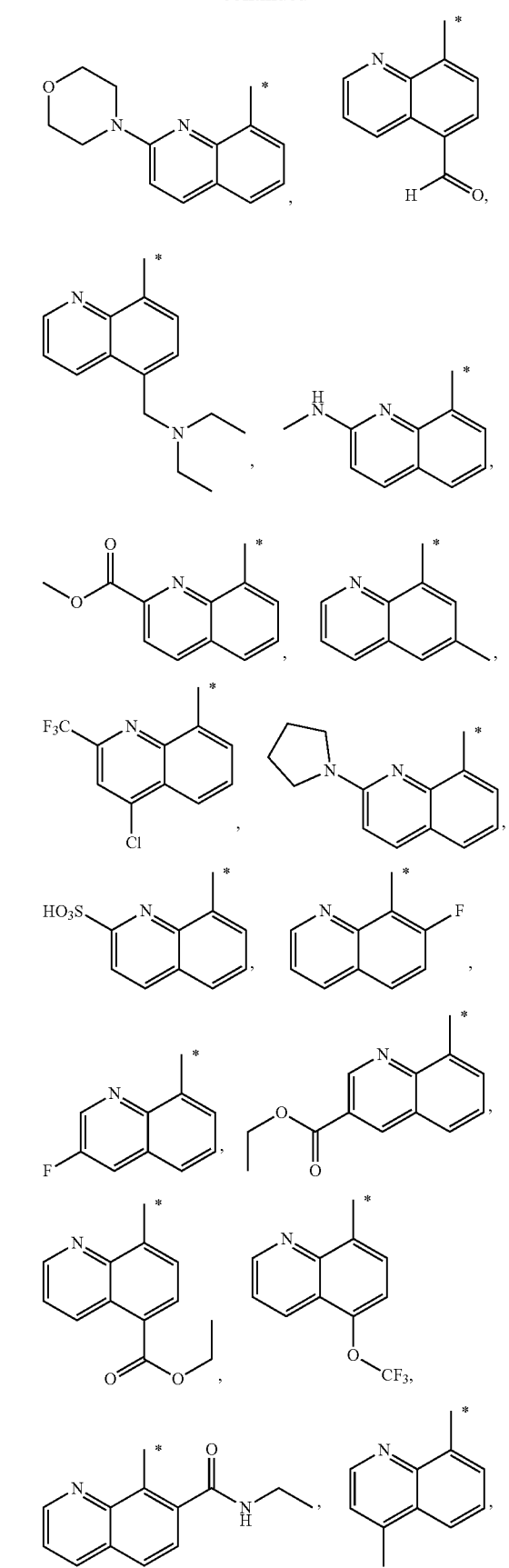

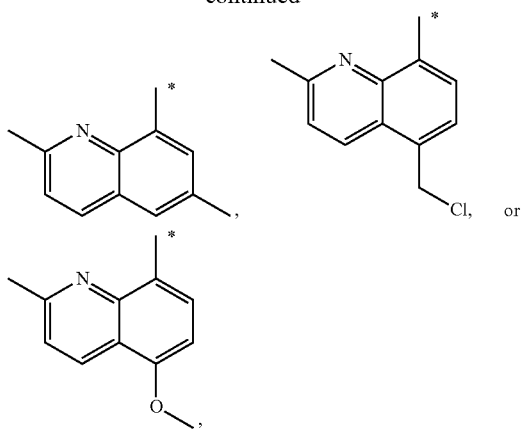

wherein * is connected to O of the side sulfonate group of the polymer.

One embodiment of the disclosure provides a metal removal composition including the above polymer. The detail of the polymer is described above, and the related description is not repeated here. In one embodiment, the metal removal composition further includes polyether sulfone, sulfonated polyether sulfone, or a combination thereof, and (1) polymer and (2) polyether sulfone, sulfonated polyether sulfone, or a combination thereof have a weight ratio of 100:0 to 100:300. If the polymer is absent, the effect of removing metal is reduced.

In one embodiment, the metal removal composition (such as the polymer of blend) has a type of fiber that has a diameter of 100 micrometers to 600 micrometers. If the fiber diameter is too small, the fiber strength is not enough. If the fiber diameter is too large, the contact area between the fiber and water to be treated will be too little. In one embodiment, the metal removal composition has a type of film that has a thickness of 20 micrometers to 60 micrometers. If the film is too thin, the strength of the film will be not enough. If the film is too thick, the contact area between the film and water to be treated will be too little.

In one embodiment, the metal removal composition may further include a water soluble polymer to serve as a porogen. The water soluble polymer includes polyvinyl pyrrolidone, polyvinyl alcohol, or polyethylene glycol, and (1) polymer and (3) water soluble polymer have a weight ratio of 100:1 to 100:15. If the water soluble polymer ratio is too low, the pores cannot be efficiently formed. If the water soluble polymer ratio is too high, the strength of the metal removal composition will be significantly lowered. For example, the polymer (or a blend formed by optionally adding (2) polyether sulfone, sulfonated polyether sulfone, or a combination thereto) and the water-soluble polymer are mixed in a solvent. The mixture is coated as a film and then dipped in water to dissolve the water soluble polymer, thereby forming pores in the film. On the other hand, the mixture can be formed as a fiber, which is then dipped in water to dissolve the water soluble polymer, thereby forming pores in the fiber. In one embodiment, the metal removal composition (e.g. film or fiber) has a porosity of 60% to 90%, which is based on the ratio of the water soluble polymer.

One embodiment of the disclosure provides a method of removing metal ions, including: contacting the described metal removal composition with a solution containing metal ions for removing the metal ions from the solution. The metal removal composition may have a type of fiber or film, and the metal ions can be iron ions, lead ions, mercury ions, cobalt ions, or cadmium ions. The detail of the metal removal composition is described above, and the related description is not repeated here.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

20 g of polyether sulfone (Ultrason® E 6020 P) was dissolved in 100 mL of dichloromethane and disposed in a reaction bottle, and cooled to 0° C. to 5° C. in ice bath. 24 g of chlorosulfonic acid was dissolved in 30 mL of dichloromethane, and then slowly and dropwise added into the reaction bottle. The above mixture was stirred and reacted under nitrogen for 16 hours, and the stirring was stopped. The reaction result was let stand until separated into two layers, and the upper layer was removed. The reaction is shown below:

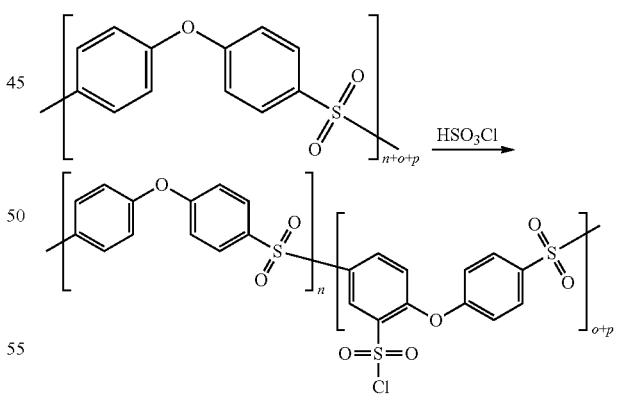

Subsequently, 4.35 g of 8-hydroxyquinoline was dissolved in 30 mL of dichloromethane, and then dropwise added into the reaction bottle. The above mixture was reacted at 30° C. in a water bath for 4 hours. The reaction result was poured into 1 L of ice water to precipitate, and the precipitate was continuously washed with water until achieving a pH value of 6 to 7. The washed precipitate was dried to obtain a pale yellow solid. The reaction is shown below:

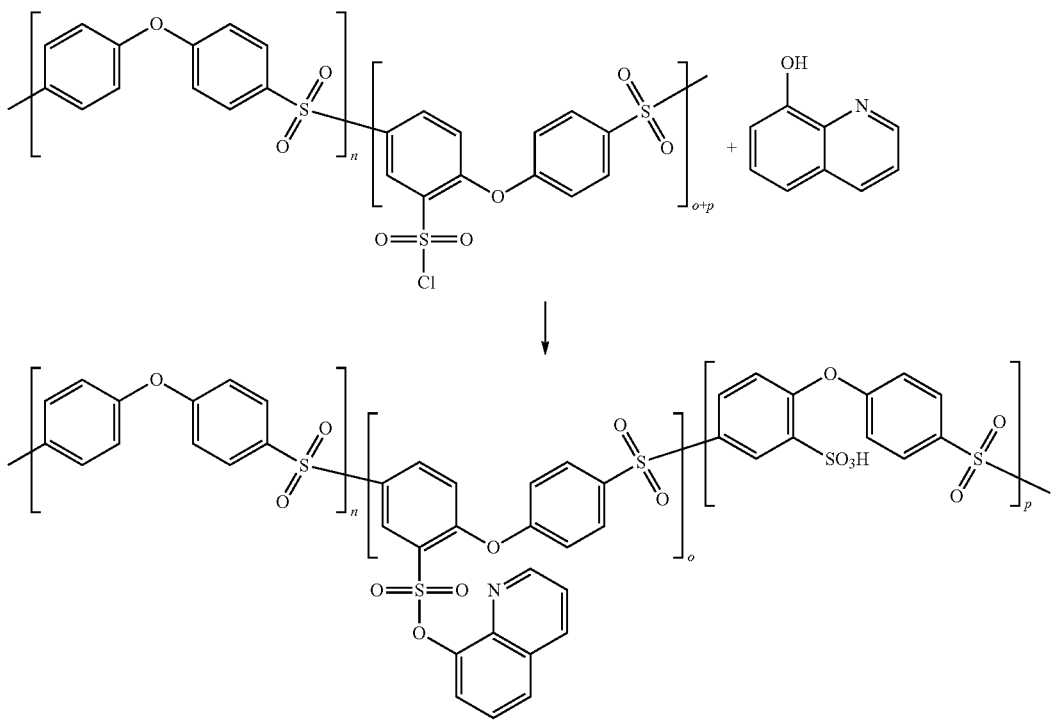

In the above formula, n=350, o=24, and p=10. The above values were determined by ¹H NMR and gel permeation chromatography (GPC). For example, the molecular weight of the polymer could be measured by GPC to calculate the value of n+o+p, and the ratio of n, o and p could be calculated from ¹H NMR, thereby obtaining the values of n, o, and p.

Preparation Example 2

80 g of polyether sulfone (Ultrason® E6020 P) was dissolved in 350 mL of concentrated sulfuric acid. The acidic solution was heated to 85° C., and reacted and stirred for 1 hour under nitrogen. The reaction result was poured into 3 L of ice water to precipitate, and the precipitate was continuously washed with water until achieving a pH value of 6 to 7. The washed precipitate was dried to obtain a white solid as sulfonated polyether sulfone. The reaction is shown below:

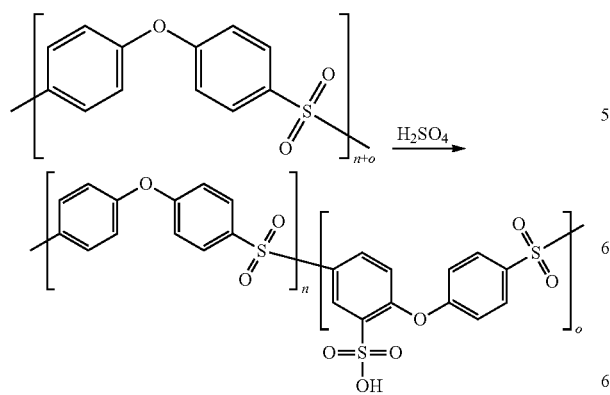

In the above formula, n=300 and o=98. The above values were determined by ¹H NMR and gel permeation chromatography (GPC).

Preparation Example 3

80 g of polyether sulfone (Ultrason@ E 6020 P) was dissolved in 350 mL of concentrated sulfuric acid. The acidic solution was heated to 85° C., and reacted and stirred for 0.5 hours under nitrogen. The reaction result was poured into 3 L of ice water to precipitate, and the precipitate was continuously washed with water until achieving a pH value of 6 to 7. The washed precipitate was dried to obtain a white solid as sulfonated polyether sulfone. The reaction is shown below:

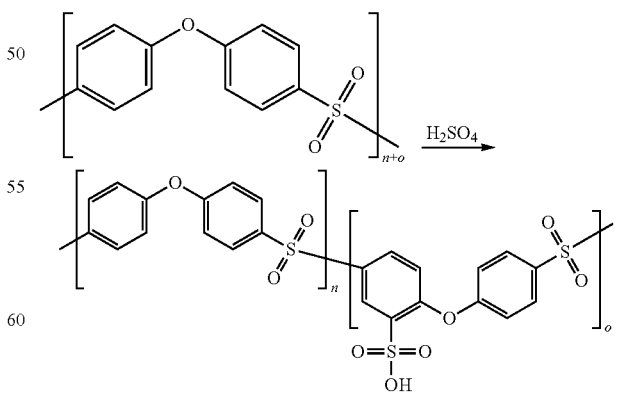

In the above formula, n=350 and o=46. The above values were determined by ¹H NMR and gel permeation chromatography (GPC).

Example 1

20 parts by weight of the product in Preparation Example 1, 0.2 parts by weight of polyvinyl pyrrolidone (PVP40, commercially available from SIGMA) serving as a porogen, and 80 parts by weight of N-methyl-2-pyrrolidone (NMP) were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 72%, which was measured according to the standard ASTM D792.

Example 2-1

5 parts by weight of the product in Preparation Example 1, 15 parts by weight of polyether sulfone (Ultrason® E 6020 P), 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 78%, which was measured according to the standard ASTM D792.

Example 2-2

10 parts by weight of the product in Preparation Example 1, 10 parts by weight of polyether sulfone (Ultrason® E 6020 P), 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 75%, which was measured according to the standard ASTM D792.

Example 2-3

15 parts by weight of the product in Preparation Example 1, 5 parts by weight of polyether sulfone (Ultrason® E 6020 P), 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 73%, which was measured according to the standard ASTM D792.

Example 3

5 parts by weight of the product in Preparation Example 1, 10 parts by weight of polyether sulfone (Ultrason® E 6020 P), 5 parts by weight of the sulfonated polyether sulfone in Preparation Example 2, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 83%, which was measured according to the standard ASTM D792.

Example 4

5 parts by weight of the product in Preparation Example 1, 10 parts by weight of polyether sulfone (Ultrason® E 6020 P), 5 parts by weight of the sulfonated polyether sulfone in Preparation Example 3, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 80%, which was measured according to the standard ASTM D792.

Comparative Example 1

20 parts by weight of polyether sulfone (Ultrason® E 6020 P), 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 69%, which was measured according to the standard ASTM D792.

Comparative Example 2-1

15 parts by weight of polyether sulfone (Ultrason® E 6020 P), 5 parts by weight of the sulfonated polyether sulfone in Preparation Example 2, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 75%, which was measured according to the standard ASTM D792.

Comparative Example 2-2

10 parts by weight of polyether sulfone (Ultrason® E 6020 P), 10 parts by weight of the sulfonated polyether sulfone in Preparation Example 2, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 79%, which was measured according to the standard ASTM D792.

Comparative Example 3-1

15 parts by weight of polyether sulfone (Ultrason® E 6020 P), 5 parts by weight of the sulfonated polyether sulfone in Preparation Example 3, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 74%, which was measured according to the standard ASTM D792.

Comparative Example 3-2

10 parts by weight of polyether sulfone (Ultrason® E 6020 P), 10 parts by weight of the sulfonated polyether sulfone in Preparation Example 3, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The porosity of the porous film was 76%, which was measured according to the standard ASTM D792.

Comparative Example 4-1

20 parts by weight of the sulfonated polyether sulfone in Preparation Example 2, 0.2 parts by weight of PVP serving as a porogen, and 80 parts by weight of NMP were mixed, and the mixture was evenly coated on a glass plate by a metal blade with a blade slit of 200 micrometers. The glass plate and the coating layer thereon were dipped into a water tank at 25° C. to remove PVP in the coating to form a porous film having a thickness of 45 micrometers to 50 micrometers. The strength of the film was not enough, and the film cracked easily.

A standard lead ion solution (10 μg/mL lead in 2% $HNO_3$) was diluted by de-ionized water to 500 ng/mL to form an aqueous solution of lead ions. The porous films of Comparative Example 1, Example 1, Comparative Example 2-1, Comparative Example 3-1, Example 2-1, Example 3, and Example 4 were respectively dipped in the aqueous solutions of lead ions for 4 hours, and then removed from the aqueous solutions of lead ions. The lead ion concentrations of the aqueous solutions of lead ions were respectively measured to determine the ability of the porous film to remove the lead ions, as shown in Table 1.

A standard iron ion solution (10 μg/mL iron in 2% $HNO_3$) was diluted by de-ionized water to 500 ng/mL to form an aqueous solution of iron ions. The porous films of Comparative Example 1, Example 1, Comparative Example 2-1, Comparative Example 3-1, Example 2-1, Example 3, and Example 4 were respectively dipped in the aqueous solutions of iron ions for 4 hours, and then removed from the aqueous solutions of iron ions. The iron ion concentrations of the aqueous solutions of iron ions were respectively measured to determine the ability of the porous film to remove the iron ions, as shown in Table 1.

TABLE 1

|  | Comparative Example 1 | Example 1 | Comparative Example 2-1 | Comparative Example 3-1 | Example 2-1 | Example 3 | Example 4 |
| --- | --- | --- | --- | --- | --- | --- | --- |
| Ability to remove lead ions (%) | 16 | 70 | 55 | 34 | 30 | 26 | 48 |
| Ability to remove iron ions (%) | 9 | 95 | 32 | 18 | 27 | 18 | 18 |

The MTT assay of the porous films from Comparative Example 1 and Example 1 was analyzed according to the standard ISO 10993. The MTT assay of the porous film from Comparative Example 1 was 86.6±8.94%, and the porous film from Example 1 was 88.09±8.58%. In other words, the porous film from Example 1 should be biocompatible.

The strength of porous films from Comparative Example 1, Example 2-1, Example 2-2, Example 2-3, Comparative Example 2-1, Comparative Example 2-2, Comparative Example 3-1, and Comparative Example 3-2 was tested, as shown in Table 2.

TABLE 2

|  | Comparative Example 1 | Example 1 | Example 2-1 | Example 2-2 | Example 2-3 | Comparative Example 2-1 | Comparative Example 2-2 | Comparative Example 3-1 | Comparative Example 3-2 |
| --- | --- | --- | --- | --- | --- | --- | --- | --- | --- |
| kgf | 0.22 ± 0.03 | 0.24 ± 0.01 | 0.44 ± 0.01 | 0.38 ± 0.05 | 0.22 ± 0.02 | 0.19 ± 0.01 | 0.13 ± 0.01 | 0.17 ± 0.03 | 0.11 ± 0.05 |

As shown above, the strength of the porous films in Examples are higher than the strength of the porous films in Comparative Examples.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A polymer, having a chemical structure of:

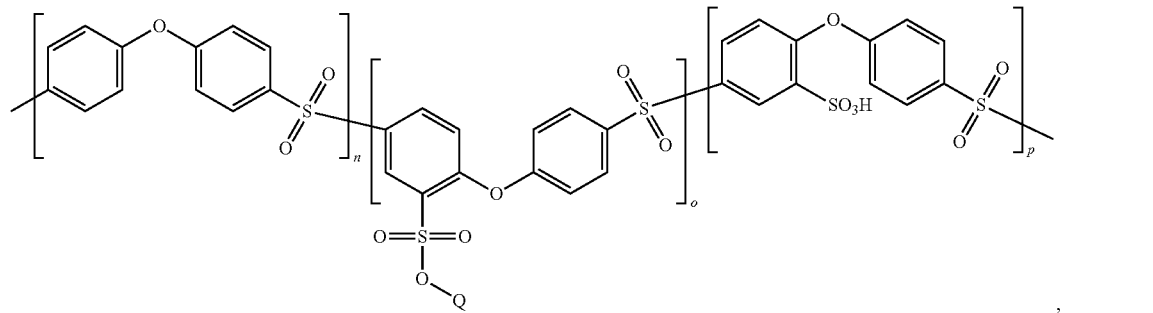

wherein Q is quinoline-based group,
n=90~450,
o=10~50, and
p=0~20.

2. The polymer as claimed in claim 1, wherein Q is

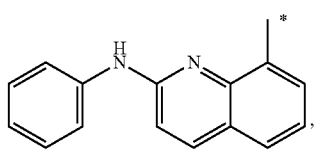

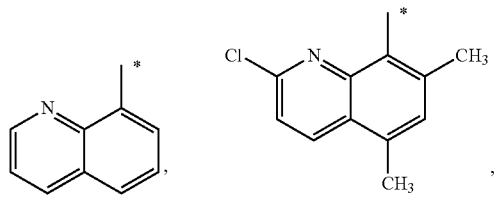

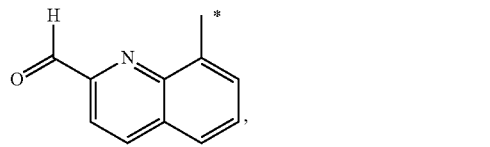

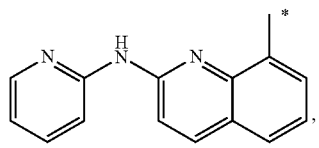

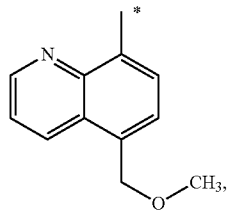

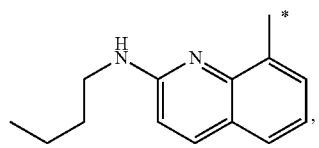

-continued

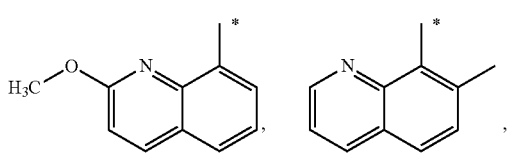

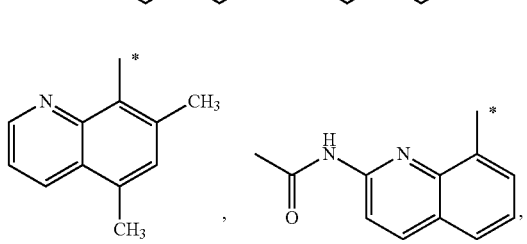

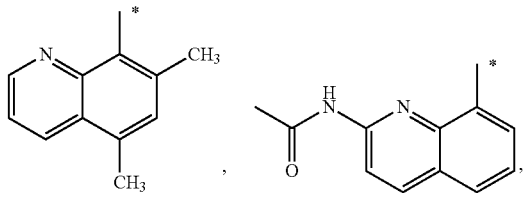

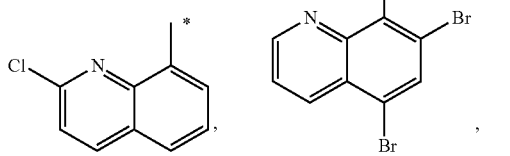

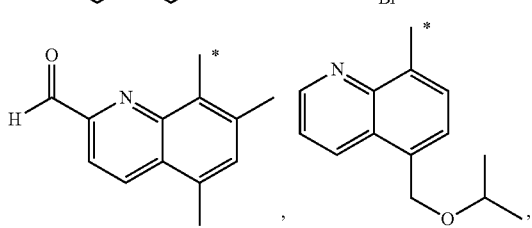

-continued
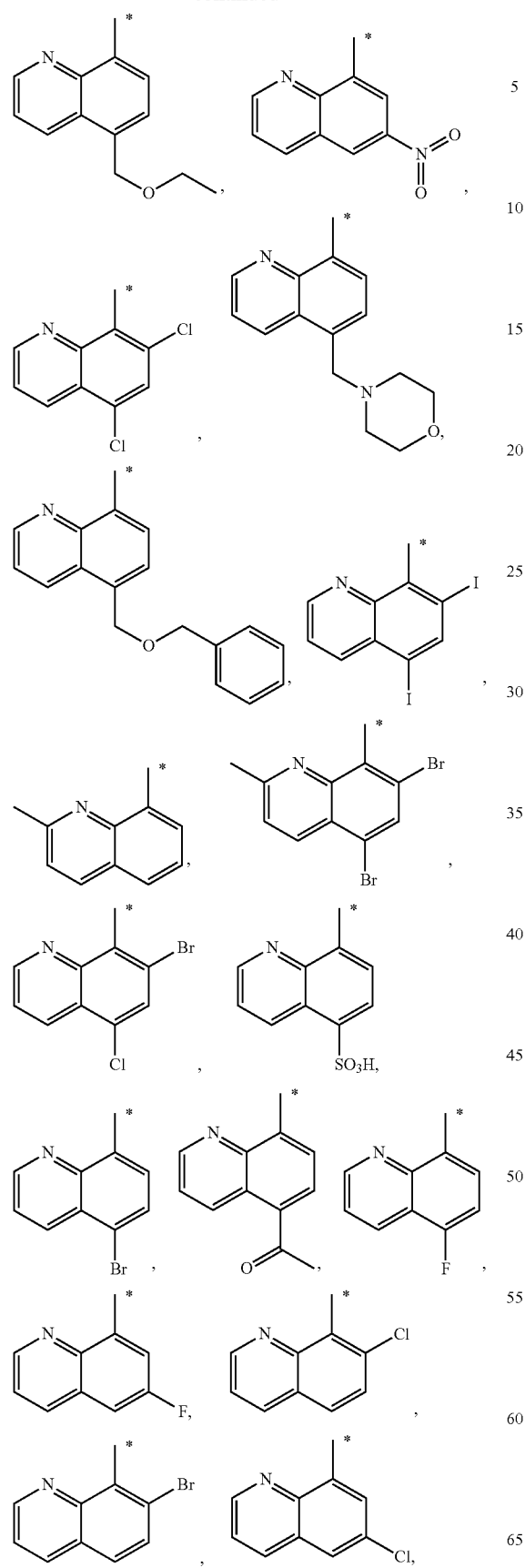
-continued
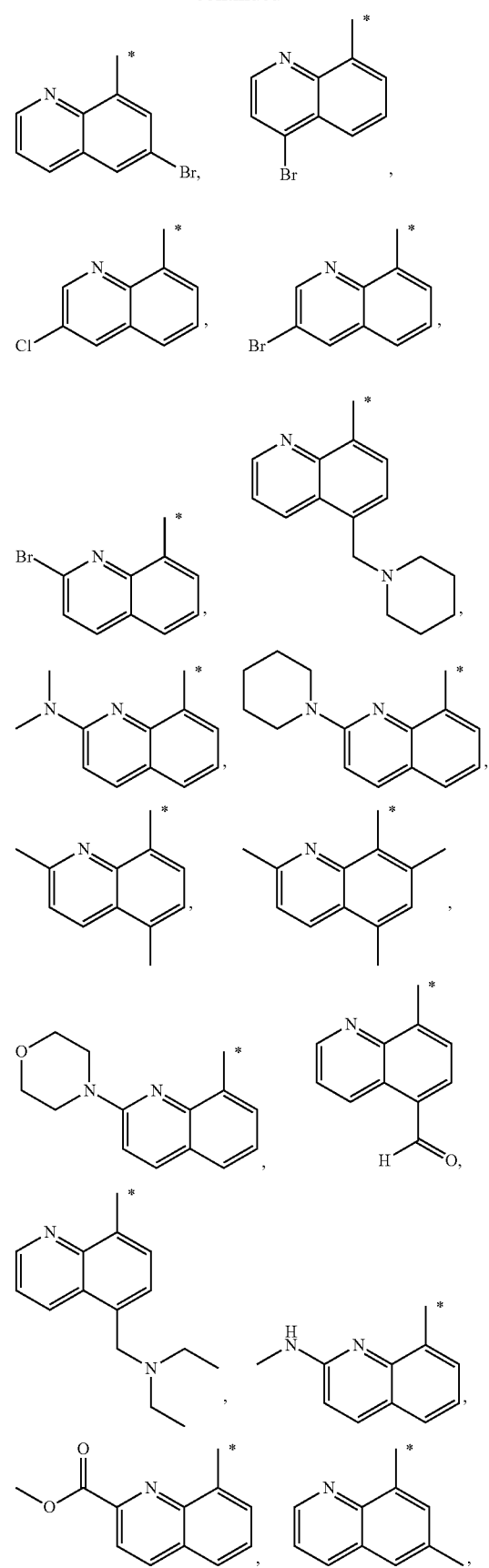

-continued

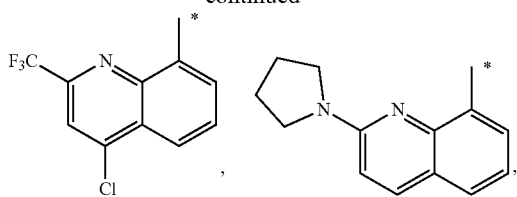

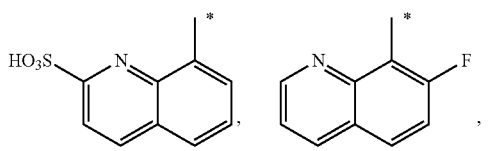

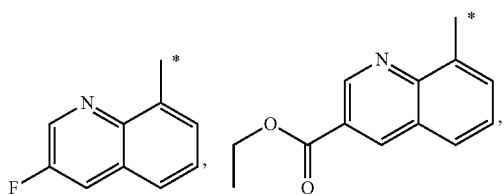

-continued

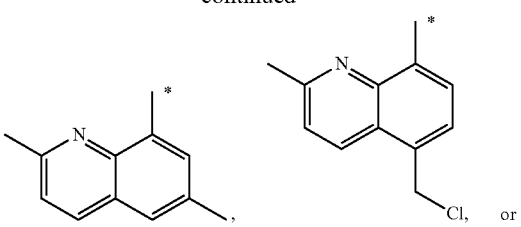

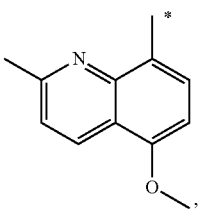

wherein * is connected to O of side sulfonate group of the polymer.

3. A metal removal composition, comprising:
a polymer, having a chemical structure of:

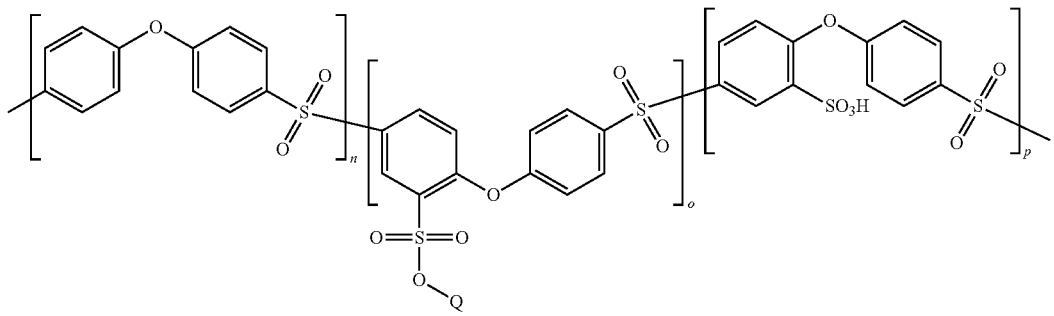

-continued

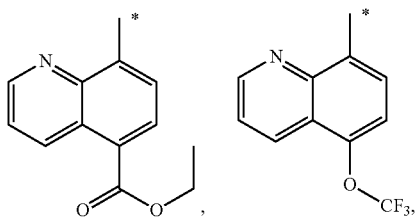

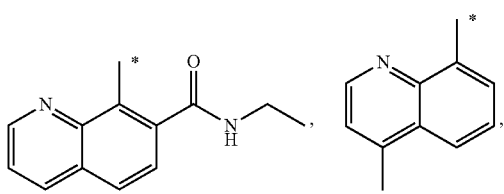

wherein Q is a quinoline-based group,
n=90~450,
o=10~50, and
p=0~20.

4. The metal removal composition as claimed in claim 3, further comprising polyether sulfone, sulfonated polyether sulfone, or a combination thereof, and (1) polymer and (2) polyether sulfone, sulfonated polyether sulfone, or a combination thereof have a weight ratio of 100:0 to 100:300.

5. The metal removal composition as claimed in claim 3, having a type of fiber that has a diameter of 100 micrometers to 600 micrometers.

6. The metal removal composition as claimed in claim 3, having a type of film that has a thickness of 20 micrometers to 60 micrometers.

7. The metal removal composition as claimed in claim 3, further comprising water soluble polymer to serve as a porogen, and the water soluble polymer includes at least one of polyvinyl pyrrolidone, polyvinyl alcohol, or polyethylene glycol.

8. The metal removal composition as claimed in claim 3, having a porosity of 60% to 90%.

9. A method of removing metal ions, comprising:
contacting a metal removal composition with a solution containing metal ions for removing the metal ions from the solution,
wherein the metal removal composition includes a polymer with a chemical structure of:

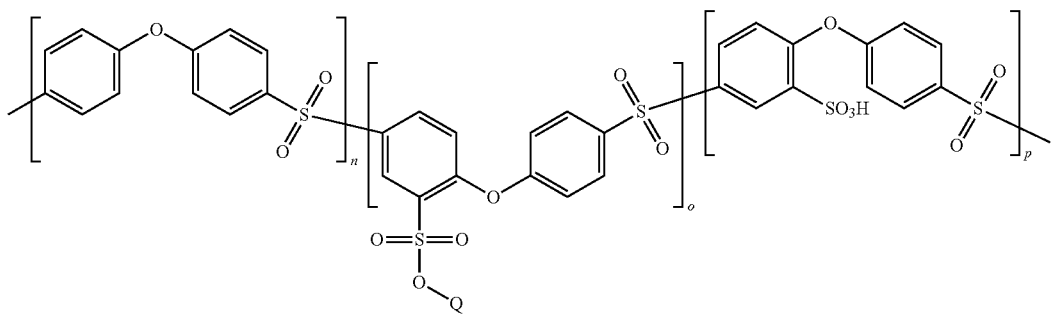

wherein Q is a quinoline-based group,
 n=90~450,
 o=10~50, and
 p=0~20.

10. The method as claimed in claim 9, wherein the metal removal composition further comprising at least one of polyether sulfone, sulfonated polyether sulfone, or a combination thereof, and (1) polymer and (2) polyether sulfone, sulfonated polyether sulfone, or a combination thereof have a weight ratio of 100:0 to 100:300.

11. The method as claimed in claim 9, wherein the metal removal composition has a type of fiber or film.

12. The method as claimed in claim 9, wherein the metal ions comprise at least one of iron ions, lead ions, mercury ions, cobalt ions, or cadmium ions.

* * * * *